(12) United States Patent
Collins

(10) Patent No.: US 7,912,155 B2
(45) Date of Patent: Mar. 22, 2011

(54) DEMODULATOR CIRCUIT

(75) Inventor: Matthew James Collins, Bath (GB)

(73) Assignee: Conexant Systems, Inc., Newport Beach, CA (US)

( * ) Notice: Subject to any disclaimer, the term of this patent is extended or adjusted under 35 U.S.C. 154(b) by 841 days.

(21) Appl. No.: 10/250,353

(22) PCT Filed: Dec. 28, 2000

(86) PCT No.: PCT/GB00/04999
§ 371 (c)(1),
(2), (4) Date: Oct. 29, 2003

(87) PCT Pub. No.: WO02/054695
PCT Pub. Date: Jul. 11, 2002

(65) Prior Publication Data
US 2004/0071229 A1    Apr. 15, 2004

(51) Int. Cl.
*H04L 27/06* (2006.01)
(52) U.S. Cl. ......................... 375/341; 375/262
(58) Field of Classification Search .............. 375/239, 375/340, 341, 261, 262, 316
See application file for complete search history.

(56) References Cited

U.S. PATENT DOCUMENTS

| | | | | |
|---|---|---|---|---|
| 5,134,635 A * | 7/1992 | Hong et al. | .................. | 375/341 |
| 6,115,435 A * | 9/2000 | Harada et al. | .................. | 375/341 |
| 6,603,734 B1 * | 8/2003 | Oksanen | ..................... | 370/203 |
| 6,662,337 B1 * | 12/2003 | Brink | ............................ | 714/792 |
| 6,754,291 B1 * | 6/2004 | Okanoue et al. | ............. | 375/341 |
| 6,977,972 B1 * | 12/2005 | Kandala et al. | ............... | 375/332 |

FOREIGN PATENT DOCUMENTS

| EP | 0 887 975 A | 12/1998 |
|---|---|---|
| GB | 2 340 353 A | 2/2000 |
| GB | 2 355 164 A | 4/2001 |

OTHER PUBLICATIONS

Park et al, A Demapping Method Using the Pilots in COFDM System, Aug. 1998, IEEE Transactions, vol. 44, No. 3, pp. 1150-1153.*
"A demapping method using the pilots in COFDM system", IEEE Transactions on Consumer Electronics, vol. 44, No. 3, Aug. 1998, pp. 1150-1153.
"Performance analysis of Viterbi Decoder using channel state information in COFDM System", IEEE Transactions on Broadcasting, vol. 44, No. 4, Dec. 1998, pp. 488-496.

* cited by examiner

*Primary Examiner* — Chieh M. Fan
*Assistant Examiner* — Freshteh N Aghdam
(74) *Attorney, Agent, or Firm* — Jackson Walker L.L.P.; Christopher J. Rourk

(57) ABSTRACT

The invention relates to a demodulator circuit in a communication system using a multi-carrier modulation scheme. The demodulator uses channel state information for respective carriers in the multi-carrier modulation to de-map the received data.

15 Claims, 3 Drawing Sheets

DEMODULATOR CIRCUIT

BACKGROUND OF THE INVENTION

1. Field of Invention

The present invention relates to a demodulator circuit in a communication system using a multi-carrier modulation scheme. The invention relates in particular to the effective demodulation of a received signal in a COFDM demodulator for a digital television receiver.

2. Related Art

Recently there has been a rapid development in the field of digital television broadcasting following the establishment of the European Digital Video Broadcast standard for digital terrestrial television (DVB-T) developed by the Digital Video Broadcasting Group.

In accordance with the DVB-T standard, a number of carrier frequencies are provided and data to be transmitted is spread over a large number of orthogonal data carriers using Coded Orthogonal Frequency Division Multiplexing (COFDM).

Each carrier can be encoded to carry a symbol containing more than one bit, for example by using a rectangular constellation modulation system such as 16-QAM, as is known to a skilled person.

An exemplary 16-QAM constellation diagram is shown in FIG. 1. As is known to a skilled person, each point on the 16-QAM constellation diagram corresponds to a 4-bit symbol. The symbols are normally assigned to the constellation points using Gray coding, in which symbols with similar most significant bits are grouped together.

At the transmitter the carriers are modulated in accordance with successive symbols to be transmitted and each received signal is demodulated in the receiver to the corresponding symbol using the constellation diagram. In most cases the signal received will not correspond exactly with a constellation point because of interference or noise in the channel between the transmitter and the receiver. In this situation the receiver must demodulate the received signal to the symbol corresponding to the constellation point which is most likely to have been transmitted.

It is known to de-map signals using soft decision decoding in which, instead of a "hard" decision as to whether a bit should be decoded as a "1" or as a "0", a soft decision, comprising the "hard" decision and an indication of the level of confidence to be placed in the decision is output.

In simple systems the level of confidence which can be placed on the demodulated or de-mapped information is proportional to the distance or separation of the received signal from the expected constellation point. Clearly, the closer the received signal is to a constellation point, the more confidence can be placed in the de-mapped symbol.

When Gray coding is used, the level of confidence that can be placed in a particular de-mapped bit varies from bit to bit within the symbol.

The information from the de-mapper is passed to a viterbi decoder which decodes the bits.

This soft decision information can be input into a soft decision Viterbi decoder. A soft decision Viterbi decoder maintains a history of many possible transmitted sequences and builds up a view of their relative likelihoods. The Viterbi decoder selects a '0' or a '1' as the decoded bit based on the maximum likelihood. In this way the Viterbi decoder can exploit information relating to the expected reliability of each bit based on the proximity of each bit to the expected constellation point.

One problem with television broadcasting is the existence of multi-paths arising either as a result of the reception at the receiver of multiple copies of the signal emitted from a single transmitter, or as a result of the reception of signals from a number of transmitters all broadcasting the same signal. In the frequency domain, the existence of multi-paths is equivalent to a frequency selective channel response.

Furthermore, in situations where conventional analog television signals are transmitted within or overlapping the frequency range used by the digital television signal, the conventional analog television signals act as narrow interfering signals within the signal bandwidth of the digital television signal.

This frequency selective channel response characteristic results in the large number of different carriers used in COFDM modulation having different signal to noise ratios (SNR). Clearly, data conveyed by carriers having a high SNR is likely to be more reliable than data conveyed by carriers having a low SNR.

An estimate of the SNR of each carrier made by the receiver is called the channel state information (CSI) for the channel represented by that carrier. FIG. 2 illustrates a typical variation in carrier CSI for a COFDM signal with co-channel analogue television interference.

One known method of establishing channel state information for a COFDM signal is disclosed in the article "A demapping method using the pilots in COFDM system" IEEE Transactions on Consumer Electronics, Vol 44 No. 3 August '98 pp 1150-1153. This method utilizes the fact that pilot carriers with known magnitudes are transmitted with the COFDM signal, for equalization purposes. An estimate is made of the mean square error in the magnitude of the received pilot carriers and channel state information in the pilot carrier positions can be obtained from this estimate. The channel state information in useful data positions can be obtained by subsequent interpolation between the values calculated at the pilot carrier frequencies.

In order to provide robust performance of the system in an environment having a frequency selective channel response, it is known to use the channel state information in the Viterbi decoder when decoding the bits in order to provide extra information regarding the reliability of the bits based on the signal to noise ratio of the carrier.

The article "Performance analysis of Viterbi Decoder using channel state information in COFDM System" IEEE Transactions on Broadcasting, Vol 44 No. 4 15 December 1998 pp 488-496, describes a Viterbi decoder which uses Channel State Information calculated from a mean square estimation of the received pilot carrier signals in a COFDM system, to affect the Viterbi decoder branch metric values used to decode 3 or 4 bit soft decision data.

Previously it has also been suggested that if the channel state information of a particular channel is sufficiently bad, it can be concluded that no reliance can be placed on the data received on that channel. As a result, the Viterbi decoder may effectively record that no information is available regarding that bit by disregarding, or "puncturing" the corresponding bit or bits.

The transmitted data is coded using a convolutional code, which introduces redundancy in the signal in order to allow error correction of the signal to be achieved. The effect of the puncturing of data bits in the Viterbi decoder as indicated above, is merely to reduce the effective code rate of the signal. If a sufficiently robust code is used, the effective reduction in code rate resulting from the puncturing of bits can be tolerated, thus avoiding an impact on the decoded signal quality.

SUMMARY

Previously known demodulator circuits are complex since the calculated channel state information must be fed forward to the Viterbi decoder through the deinterleaver. However, this requires a relatively large amount of data to be passed through the deinterleaver.

The present invention provides means for demapping data effectively using channel state information.

In accordance with a first aspect of the invention, there is provided as claims.

BRIEF DESCRIPTION OF THE DRAWINGS

For a better understanding of the present invention, and to show how it may be brought into effect, reference will now be made, by way of example, to the accompanying drawings, in which.

DETAILED DESCRIPTION OF PREFERRED EMBODIMENTS

An embodiment of the invention will now be described with reference to the accompanying drawings.

Figure 3:
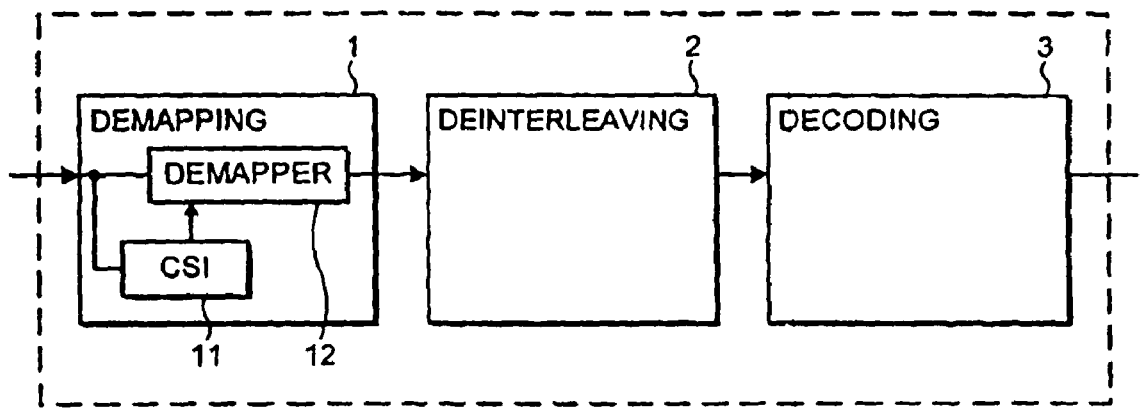
FIG. 3 is a diagrammatic representation of the main components of a demodulator circuit in accordance with the invention.

FIG. 3 is a diagrammatic representation of the main components of a demodulator circuit in accordance with an embodiment of the invention.

The demodulator circuit consists of a de-mapping block 1, a bit and symbol de-interleaving block 2 and a Viterbi decoder 3. The received de-modulated signal is applied to the input of the de-mapping block 1 and the de-mapping block 1 de-maps the received signal and outputs decision data comprising an estimate of the transmitted data together with an indication of the level of confidence to be placed in the estimate. The decision data output from the de-mapping block 1 is input to the bit and symbol de-interleaving block 2. The de-interleaved decision data is input to the viterbi decoder 3 which generates a demodulated output based on the input decision data.

The de-mapping block 1 comprises channel state information (CSI) calculation block 11 in addition to a de-mapper 12. The CSI calculation block 11 determines the channel state information for each carrier used in the multi-carrier modulated signal. The channel state information calculated by the CSI calculation block 11 is used by the de-mapper 12 to generate decision data for a received signal using that carrier in a manner dependent on the channel state information for the respective carrier.

Figure 1:
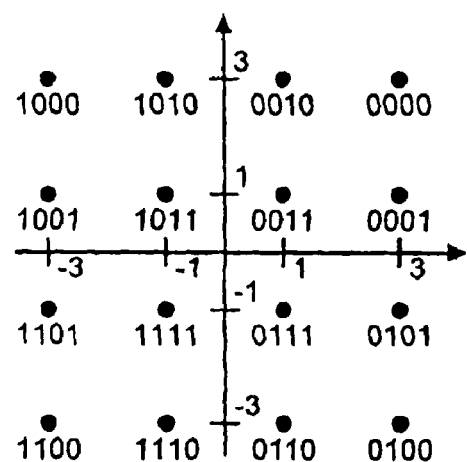
FIG. 1 is an exemplary diagrammatic representation of a 16-QAM constellation diagram.
Figure 2:
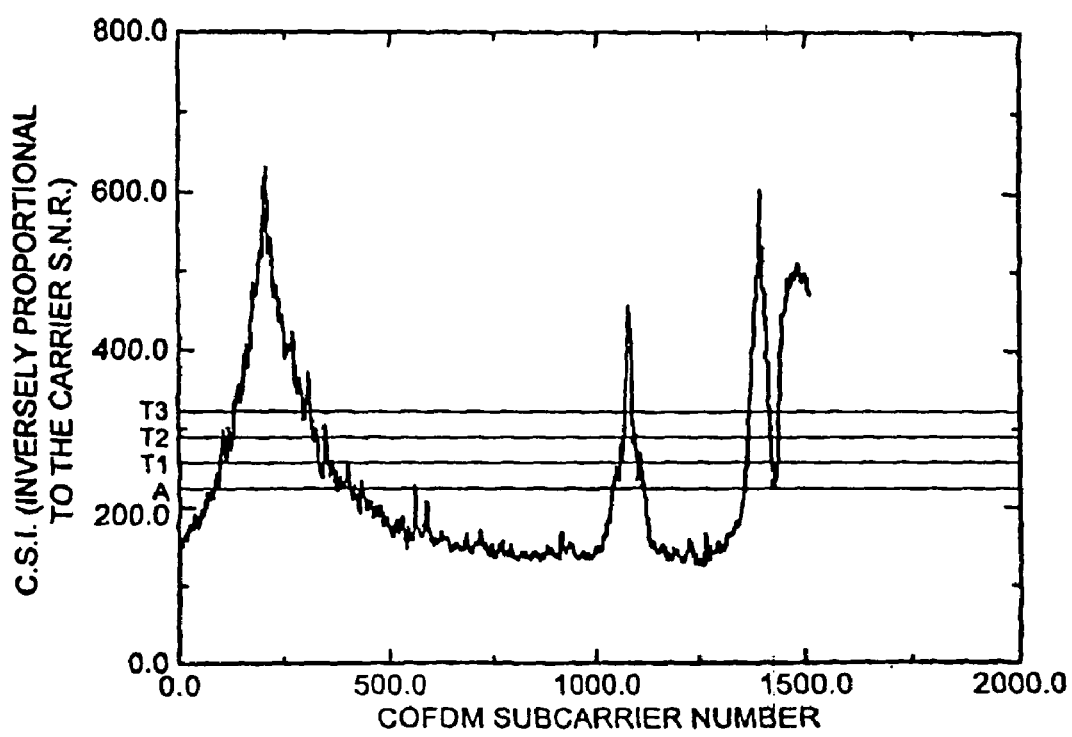
FIG. 2 illustrates a typical variation in carrier CSI for a COFDM signal with co-channel analogue television interference.

The channel state information may be calculated in a number of ways, including ways known from the state of the art. FIG. 2 shows a typical plot of Channel State Information (being inversely proportional to Signal to Noise Ratio) for each COFDM subcarrier number, in a situation where there is an interfering co-channel analogue TV signal.

Figure 4:
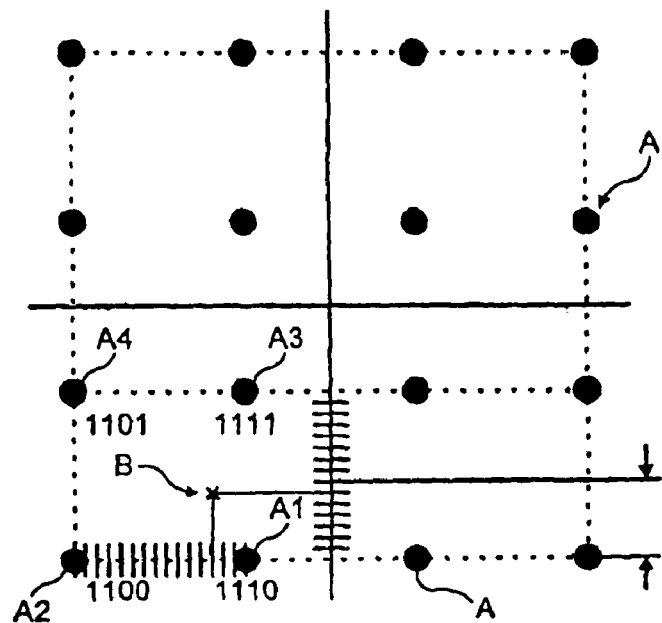
FIG. 4 is an exemplary diagrammatic representation of a 16-QAM constellation diagram, showing the soft decision regions between the points on the constellation grid.

FIG. 4 shows a constellation grid for a 16 QAM system, which is described herein as an exemplary transmission system, to illustrate the implementation of the invention. As is known to a skilled person, each constellation point A on the constellation diagram represents the phase/amplitude characteristic of an expected signal (i.e. a possible transmitted signal). However the actual received signal is normally different from the expected constellation part, as indicated in this case by the exemplary received signal point B.

Specifically, the CSI values established as outlined above are used in the establishment of the soft decision data to be used during de-mapping of each item of data in the de-mapping block 1 shown in FIG. 3.

A method for de-mapping data in the de-mapping block 1 shown in FIG. 3 using channel state information calculated as described with reference to FIG. 4 will now be described with reference to FIGS. 2 and 5.

Firstly, the average value of the CSI, over all of the COFDM subchannels, is calculated. This is shown as A in FIG. 2. From the average value A, three thresholds T1, T2 and T3 are calculated. For example, T1 may be chosen to be the average value A plus a first difference value B, T2 may be chosen to be the average value A plus a second larger difference value C, and T3 may be chosen to be the average value A plus a third still larger difference value D.

On receipt of a signal to be demodulated, soft decision values are assigned in connection with each of the transmitted information bits, depending on the distance of the signal from the neighboring constellation points. For example, the received sub-carrier shown at point B in FIG. 4 is between four constellation points A1, A2, A3 and A4. The soft decision bits are therefore determined on the basis of the distance of point B from these constellation points.

In this illustrated embodiment, a four bit soft decision value is available. Thus, each soft decision value is a number from 0 to 15, with a value of 0 indicating maximum confidence that the information bit has a binary value of 0, and a value of 15 indicating maximum confidence that the information bit has a binary value of 1, with intermediate values indicating corresponding levels of confidence in the binary value of the information bit.

As mentioned above, the received sub-carrier shown at point B in FIG. 4 is between four constellation points A1, A2, A3 and A4. These points do not differ in their first and second most significant bits, and so soft decision values of 15 are assigned to each of these two bits, indicating maximum confidence that the information bits each have binary values of 1.

In the case of the third most significant bit, a soft decision value is assigned, based on the position of point B along a horizontal axis between the vertical lines A2-A4 and A1-A3. Based on the illustrated position of point B, a provisional soft decision value of 12 is assigned, indicating that the information bit is somewhat more likely to be a 1 than a O.

Similarly, in the case of the fourth most significant bit, a soft decision value is assigned, based on the position of point B along a vertical axis between the horizontal lines A2-A1 and A4-A3. Based on the illustrated position of point B, a provisional soft decision value of 6 is assigned, indicating that the information bit is slightly more likely to be a 0 than a 1.

Based on the CSI value for the carrier, these provisionally assigned soft decision values can then be reconsidered.

Figure 5:
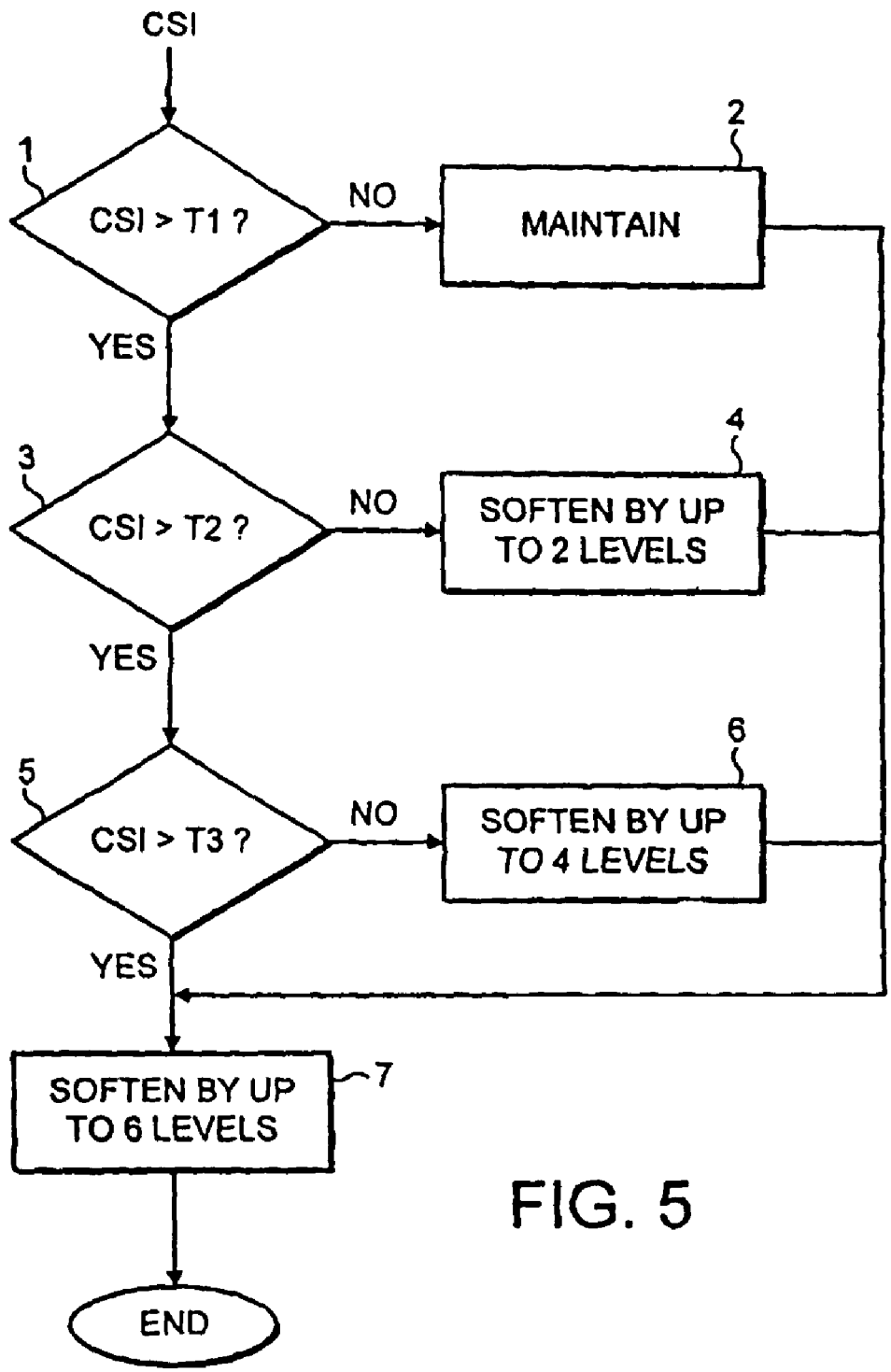
FIG. 5 is a flow chart showing the de-mapping method in accordance with one embodiment of the invention.

Thus, as shown in FIG. 5, the CSI value for the channel carrying that signal is compared with the first threshold T1 (step 1). If the CSI value is less than the first threshold, the carrier can be considered to have a good signal to noise ratio, and the provisional soft decision value an be maintained (step 2).

If the CSI value is greater than the first threshold T1 in step 1, the CSI value is compared to a second, higher, threshold T2 in step 3. If T1<CSI value<T2, the carrier can be considered to have a slightly worse signal to noise ratio. In this situation, the process passes to step 4. In this case, the provisionally determined soft decision value is moved two levels towards the centre of the range. Thus, in the illustrated case, the soft decision value assigned to the third information bit of the sub-carrier B would be changed from the provisionally determined value of 12 to a value of 10.

If the CSI value is greater than the second threshold T2 in step 3, the CSI value is compared to a third, yet higher, threshold T3 in step 5. If T2<CSI value<T3, the carrier can be considered to have a relatively bad signal to noise ratio. In this situation, the process passes to step 6. In this case, the provisionally determined soft decision value is moved four levels towards the centre of the range. Thus, in the illustrated case, the soft decision value assigned to the third information bit of the sub-carrier B would be changed from the provisionally determined value of 12 to a value of 8.

Finally, if the CSI value is greater than the third threshold T3, the carrier can be considered to have a sufficiently bad signal to noise ratio that very little reliance can be placed on the decoded bits. In this situation, the process passes to step 6. In this case, the provisionally determined soft decision value can be moved six levels towards the centre of the range. Thus, in the illustrated case, this would suggest that the soft decision value assigned to the signal B would be changed from the provisionally determined value of 12 to a value of 6.

However, in all of steps 4, 6 and 8, no new soft decision value should be applied which is on the opposite side of the midpoint of the range. Thus, when a provisionally determined soft decision value is 7 or less, the amended soft decision value is not made greater than 7. Similarly, when a provisionally determined soft decision value is 8 or more, the amended soft decision value is not made less than 8.

Thus, in the illustrated case, even if the CSI value is very high, the soft decision value assigned to the third information bit of the sub-carrier B is changed only to a value of 8, because it is still slightly more likely that the third information bit should be a 1 rather than a O.

In accordance with the invention, therefore, the channel state information is incorporated by the de-mapper 12 in the decision data, and all the CSI functions are contained within the de-mapping block 1. As a result it is not necessary to pass channel state information through the de-interleaving process to the Viterbi decoder as separate information, resulting in reduced data path widths and reduced power requirements.

Thus a preferable demodulator circuit for demodulating a multi-carrier modulated signal using channel state information is disclosed.

What is claimed is:

1. A method of determining decision data for an information signal on a sub-carrier of a multi-carrier modulated signal using an electronic signal processor, the method comprising:
    electronically determining provisional decision data, based on a detected sub-carrier position relative to a constellation grid; and
    electronically allowing the provisional decision data to remain the same if channel state information for the respective sub-carrier is less than a first threshold, comprising adjusting the provisional decision data by a predetermined amount if the channel state information for the respective sub-carrier is greater than the first threshold and less than a second threshold, wherein the provisional decision data is adjusted by a second predetermined amount if the channel state information for the respective sub-carrier is greater than the second threshold and less than a third threshold;
    said first threshold value being set relative to a mean channel state information of a plurality of sub-carriers.

2. The method of claim 1 wherein electronically allowing the provisional decision data to remain the same if the channel state information for the respective sub-carrier is less than the first threshold comprises adjusting the provisional decision data by a second predetermined amount if the channel state information for the respective sub-carrier is greater than the second threshold and less than the third threshold that is greater than the mean channel state information of the plurality of sub-carriers.

3. The method of claim 1 wherein electronically allowing the provisional decision data to remain the same if the channel state information for the respective sub-carrier is less than the first threshold comprises adjusting the provisional decision data by a third predetermined amount if the channel state information for the respective sub-carrier is greater than a third threshold.

4. The method of claim 1 wherein the provisional decision data is adjusted by a third predetermined amount if the channel state information for the respective sub-carrier is greater than the third threshold that is greater than the mean channel state information of the plurality of sub-carriers.

5. The method of claim 1 wherein electronically allowing the provisional decision data to remain the same if the channel state information for the respective sub-carrier is less than the first threshold comprises:
    allowing the provisional decision data to remain the same if the channel state information for the respective sub-carrier is less than the first threshold that is greater than the mean channel state information of the plurality of sub-carriers; and
    adjusting the provisional decision data by a first predetermined amount if the channel state information for the respective sub-carrier is greater than the first threshold.

6. The method of claim 5 wherein the provisional decision data is adjusted by a second predetermined amount if the channel state information for the respective sub-carrier is greater than a second threshold that is greater than the mean channel state information of the plurality of sub-carriers and less than a third threshold that is greater than the mean channel state information of the plurality of sub-carriers.

7. The method of claim 6 wherein the provisional decision data is adjusted by a third predetermined amount if the channel state information for the respective sub-carrier is greater than the third threshold.

8. An electronic signal processor comprising:
    a system for electronically determining provisional decision data, based on a detected sub-carrier position relative to a constellation grid;
    a system for electronically allowing the provisional decision data to remain the same if channel state information for the respective sub-carrier is less than a first threshold; said first threshold value being set relative to a mean channel state information of a plurality of sub-carriers; and
    a system for adjusting the provisional decision data by a first predetermined amount if the channel state information for the respective sub-carrier is greater than the first threshold, wherein the provisional decision data is adjusted by a second predetermined amount if the channel state information for the respective sub-carrier is greater than a second threshold and less than a third threshold.

9. The system of claim 8 comprising a system for adjusting the provisional decision data by the second predetermined amount if the channel state information for the respective sub-carrier is greater than the second threshold and less than the third threshold that is greater than the mean channel state information of the plurality of sub-carriers.

10. The electronic signal processor of claim 8 wherein the provisional decision data is adjusted by a third predetermined amount if the channel state information for the respective sub-carrier is greater than the third threshold that is greater than the mean channel state information of a plurality of sub-carriers.

11. The electronic signal processor of claim 8 comprising:
a system for allowing the provisional decision data to remain the same if the channel state information for the respective sub-carrier is less than the first threshold that is greater than the mean channel state information of the plurality of sub-carriers; and
a system for adjusting the provisional decision data by the first predetermined amount if the channel state information for the respective sub-carrier is greater than the first threshold.

12. An electronic signal processor comprising:
a system for electronically determining provisional decision data, based on a detected sub-carrier position relative to a constellation grid;
a system for electronically allowing the provisional decision data to remain the same if channel state information for the respective sub-carrier is less than a first threshold, said first threshold value being set relative to a mean channel state information of a plurality of sub-carriers; and
a system for adjusting the provisional decision data by a first predetermined amount if the channel state information for the respective sub-carrier is greater than the first threshold, wherein the provisional decision data is adjusted by a second predetermined amount if the channel state information for the respective sub-carrier is greater than a second threshold and less than a third threshold, and wherein the provisional decision data is adjusted by a third predetermined amount if the channel state information for the respective sub-carrier is greater than the third threshold.

13. The electronic signal processor of claim 12 comprising a system for adjusting the provisional decision data by the second predetermined amount if the channel state information for the respective sub-carrier is greater than the second threshold that is greater than the mean channel state information of the plurality of sub-carriers and less than the third threshold.

14. The electronic signal processor of claim 12 comprising a system for adjusting the provisional decision data by the third predetermined amount if the channel state information for the respective sub-carrier is greater than the third threshold that is greater than the mean channel state information of the plurality of sub-carriers.

15. The electronic signal processor of claim 12 comprising:
a system for allowing the provisional decision data to remain the same if the channel state information for the respective sub-carrier is less than the first threshold that is greater than the mean channel state information of the plurality of sub-carriers; and
a system for adjusting the provisional decision data by the first predetermined amount if the channel state information for the respective sub-carrier is greater than the first threshold.

* * * * *